United States Patent
Salameh

(10) Patent No.: US 10,719,701 B2
(45) Date of Patent: Jul. 21, 2020

(54) OPTICAL CHARACTER RECOGNITION OF CONNECTED CHARACTERS

(71) Applicant: Accenture Global Solutions Limited, Dublin (IE)

(72) Inventor: Tariq Mohammad Salameh, Dubai (AE)

(73) Assignee: Accenture Global Solutions Limited, Dublin (IE)

( * ) Notice: Subject to any disclaimer, the term of this patent is extended or adjusted under 35 U.S.C. 154(b) by 220 days.

(21) Appl. No.: 15/962,394

(22) Filed: Apr. 25, 2018

(65) Prior Publication Data

US 2019/0332860 A1    Oct. 31, 2019

(51) Int. Cl.
| | |
|---|---|
| G06K 9/00 | (2006.01) |
| G06K 9/40 | (2006.01) |
| G06K 9/42 | (2006.01) |
| G06K 9/46 | (2006.01) |
| G06T 5/30 | (2006.01) |

(52) U.S. Cl.
CPC .......... *G06K 9/00463* (2013.01); *G06K 9/40* (2013.01); *G06K 9/42* (2013.01); *G06K 9/46* (2013.01); *G06T 5/30* (2013.01); *G06K 2209/01* (2013.01)

(58) Field of Classification Search
CPC . G06K 2209/013; G06K 9/00879; G06T 7/11
See application file for complete search history.

(56) References Cited

U.S. PATENT DOCUMENTS

| | | | |
|---|---|---|---|
| 10,176,391 B1* | 1/2019 | Mahmoud | G06K 9/4676 |
| 2001/0036293 A1* | 11/2001 | Laumeyer | G06K 9/00818 |
| | | | 382/104 |
| 2014/0263780 A1* | 9/2014 | Day, Jr. | A47J 42/38 |
| | | | 241/63 |
| 2018/0300569 A1* | 10/2018 | Elarian | G06K 9/00859 |

OTHER PUBLICATIONS

Behrad et al., "A novel framework for Farsi and latin script identification and Farsi handwritten digit recognition" Journal of Automatic Control, Jan. 31, 2010, 20(1):17-25.
EP Search Report in European Application No. EP19168411, dated Sep. 16, 2019, 8 pages.
Peng et al., "Markov Random Field Based Text Identification from Annotated Machine Printed Documents" 10th International Conference on Document Analysis and Recognition, Jul. 26, 2009, pp. 431-435.

* cited by examiner

*Primary Examiner* — Ross Varndell
(74) *Attorney, Agent, or Firm* — Fish & Richardson P.C.

(57) ABSTRACT

Implementations for optical character recognition of a language script can include actions of receiving an image comprising a graphical representation of a word written in the language script, segmenting the word into two or more segments, each segment being determined based on one or more of a variation in a height of the word and a variation in a width of the word, and including at least one character, providing a boundary for each segment of the two or more segments, the boundary enclosing the at least one character of a respective segment, each boundary having an edge with respect to an axis of the image, normalizing boundaries of the two or more segments by aligning edges of the boundaries, and labeling each segment of the two or more segments with a respective label, the respective label indicating a language character within the respective boundary.

30 Claims, 6 Drawing Sheets

OPTICAL CHARACTER RECOGNITION OF CONNECTED CHARACTERS

BACKGROUND

Optical character recognition (OCR) is a technique to convert images of text (e.g., a scanned document, a photo of a document, an image that includes text, etc.) into machine-encoded text (e.g., text data). OCR has been widely used in digitizing printed data for data entry, editing, searching, and storing data electronically. OCR can have different levels of accuracy depending on the particular language. For example, for English text, OCR is relatively accurate. For other languages, such as languages using the Arabic alphabet, and written in Arabic script, OCR can be highly inaccurate. In Arabic script, for example, individual letters change shape relative to their position within a word.

SUMMARY

Implementations of the present disclosure include computer-implemented methods for optical character recognition. More particularly, implementations of the present disclosure are directed to recognition of connected characters, Arabic script, in particular.

In some implementations, actions include receiving an image comprising a graphical representation of a word written in the language script, segmenting the word into two or more segments, each segment being determined based on one or more of a variation in a height of the word and a variation in a width of the word, and including at least one character, providing a boundary for each segment of the two or more segments, the boundary enclosing the at least one character of a respective segment, each boundary having an edge with respect to an axis of the image, normalizing boundaries of the two or more segments by aligning edges of the boundaries, and labeling each segment of the two or more segments with a respective label, the respective label indicating a language character within the respective boundary. Other implementations include corresponding systems, apparatus, and computer programs, configured to perform the actions of the methods, encoded on computer storage devices.

These and other implementations may each optionally include one or more of the following features: actions further include, prior to segmenting, filtering the image to remove noise; actions further include, prior to segmenting, scaling the image; actions further include, prior to segmenting, applying a morphology filter to transform the image; actions further include adjusting the boundary of each segment to normalize pixel size across segments; normalizing includes scaling at least one boundary, scaling comprising one of shrinking using an inter-area algorithm, and enlarging using an inter-cubic algorithm; the edges of the boundaries are aligned; the language script is Arabic script, and the language character is an Arabic character; each segment includes a single character only; and actions further include determining one or more of a height of the boundary and a width of the boundary.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
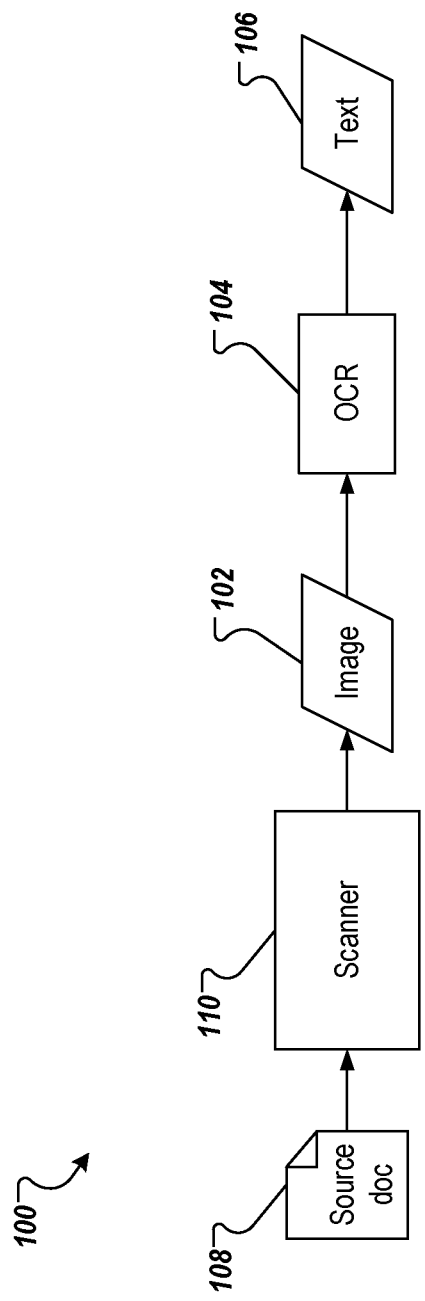
FIG. 1 depicts an example environment that can be used to execute implementations of the present disclosure.

Implementations of the present disclosure include computer-implemented methods for optical character recognition (OCR). More particularly, implementations of the present disclosure are directed to recognition of characters that are connected to each other. The characters can include Arabic alphanumerical characters in words written in Arabic script. For example, an Arabic word may have multiple characters connected to each other, each character being altered from its original form depending on its location within the word.

As described in further detail herein, implementations of the present disclosure provide for segmenting input data (e.g., text), and labeling each segment of the segmented input data. In some examples, each segment corresponds to at least one character. To recognize and/or label characters in text (e.g., a word), implementations of the present disclosure segment the text into multiple segments. In some examples, segmentation is performed based on a variation in the height of the text, and/or discontinuity in the text. Each segment includes at least one character, and is enclosed by a boundary. In some examples, segments are normalized based on their boundaries, sizes, and/or number of pixels. The characters in the segments are recognized, and/or labeled based on a set of training data, such as alphanumerical characters (e.g., Arabic alphabetic characters).

Traditional OCR techniques focus on separated characters (e.g., typed English characters). Accordingly, the error rate of the traditional OCR techniques in recognizing connected characters is much lower in languages using the Latin alphabet (e.g., English, French, German), than languages using the Arabic alphabet (e.g., Arabic, Farsi, Azerbaijani, Pashto, Kurdish, Lurish, Mandinka, etc.). Higher error rates can be costly. For example, an incorrect OCR can cause a wrong classification, or even loss of data. As another example, a wrongly recognized character may cause misleading information that can cause unintended consequences. Further, additional technical resources may need be expended to improve accuracy of OCR with such languages.

In view of this, implementations of the present disclosure provide methods and systems that recognize printed text containing connected characters, such as Arabic script. As described herein, implementations of the present disclosure improve OCR error rates for languages written in Arabic script, as compared to traditional techniques. In accordance with implementations of the present disclosure, text (e.g., a word, a group of words) is segmented. In some examples, text is segmented based on a variation in height of the text, and/or discontinuity of the text. One or more characters in each segment are labeled based on a classifier. The classifier includes a machine-learned (ML) model that is trained using a set of training data. The set of training data can be obtained through a supervised learning process. For example, a user may provide a first round of training data, including one or more characters, to the system. In some examples, the first round of training data includes one or more segmentation, and labeling processes. In some implementations, the system self-trains based on feedback on one or more OCR'd images. For example, the system may receive feedback from one or more users indicating the accuracy, and/or errors in the text data provided by the OCR of the present disclosure.

FIG. 1 depicts an example environment 100 that can be used to execute implementations of the present disclosure. The example environment 100 includes image data 102, an OCR module 104, and text data 106. In some examples, the image data 102 is processed by the OCR module 104 to provide the text data 106. That is, the OCR module 104 processes the image data 102 in accordance with implementations of the present disclosure, as described herein, to provide the text data 106. In some examples, the image data 102 is provided from a source document 108 (e.g., a physical document) that is scanned using a scanner 110 (e.g., hardware).

In accordance with implementations of the present disclosure, multiple documents can be provided as input data. In some implementations, an image (e.g., image data) is provided for each document, or at least a portion of each document. In some implementations, the image data is processed to remove noise. In some examples, each image is provided as, or is converted to a grayscale image, and noise is removed using grayscale erosion. In this manner, each image can be provided as a filtered, or clean image.

In some implementations, the images are further processed for uniformity in size. For example, a target image size can be provided (e.g., A pixels*B pixels), and each image can be scaled (e.g., up, down), such that all images are of the target image size. In this manner, potential missed recognition due to image size can be avoided (e.g., characters too small to be recognized).

As described herein, implementations of the present disclosure segment text provided in the (cleaned, scaled) images (e.g., the image data 102 of FIG. 1). In some implementations, the images are transformed to greyscale images using a morphology filter. For example, a so-called black hat transform can be applied to the images to provide the images as greyscale images. In some implementations, borders of the images are enlarged by a predefined number of pixels to improve recognition of characters that are near the borders.

In accordance with implementations of the present disclosure, text within an image is segmented. In some implementations, Otsu image processing is applied to the image. In some examples, Otsu image processing that does converts the greyscale image to a black and white image, then invert the image (e.g., black is converted to white, white is converted to black). The (inverted, black and white) image is segmented based on continuity/discontinuity of the text, as described in further detail herein.

Figure 2A:
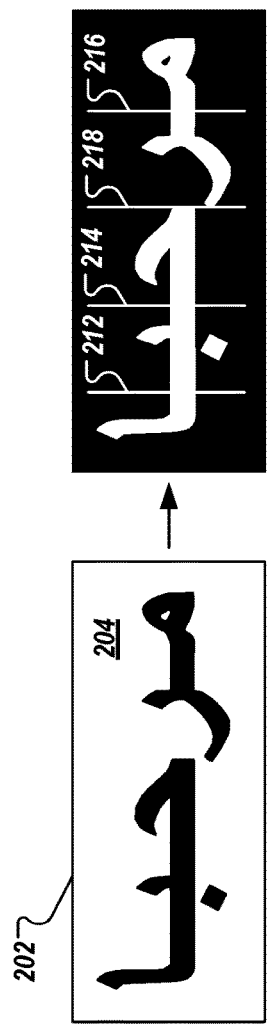
FIGS. 2A-2C illustrate an example segmentation of an example word in accordance with implementations of the present disclosure.
Figure 2B:
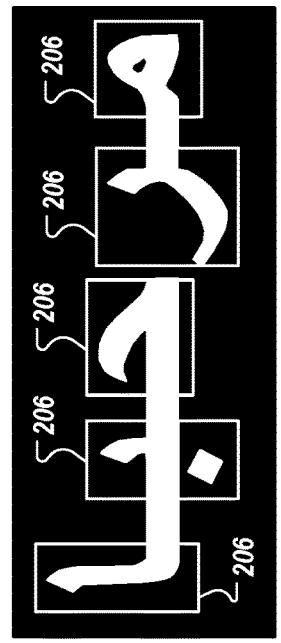
Figure 2C:
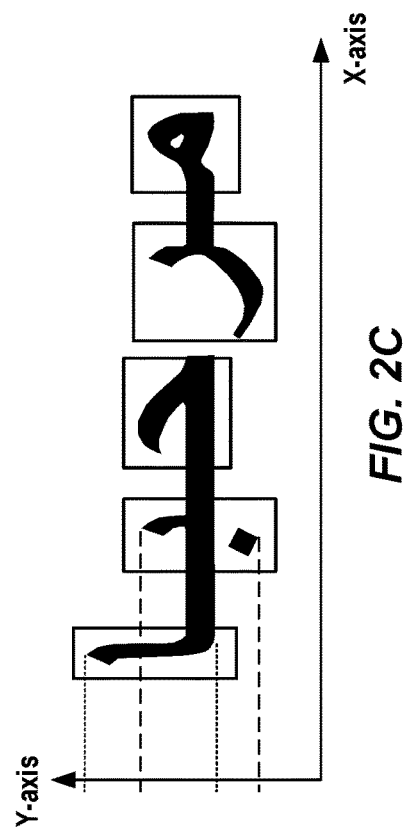

FIGS. 2A-2C illustrate example segmentation of an example word in accordance with implementations of the present disclosure. FIG. 2A depicts an image 202 that includes a word 204 with at least two connected characters. In the depicted example, the word 204 is written in Arabic script ("hello" in Arabic). In some examples, the image 202 of FIG. 2A is provided after filtering of an original image, and can be provided as a black/white image, or grayscale image. In some examples, the image 202 can be inverted, as depicted in FIG. 2A.

As depicted in FIG. 2B, the word 204 is segmented into multiple segments 206. Each of the segments 206 includes at least one character (e.g., Arabic character). Each segment 206 is defined by a boundary (e.g., one or more lines) that enclose the at least one character. In the depicted example, the boundaries of the segments 206 are provided as rectangles. It is contemplated, however, that boundaries can be provided in any appropriate shape.

In some implementations, segmentation of the word 204 is performed based on height variation within the word 204. For example, and as depicted in FIG. 2C, heights can vary within the image 202 along the word 204 with respect to a y-axis. In further detail, moving along an x-axis, the height of the word can change. In some examples, at least one segment marker is applied at a location along the x-axis where the height of the word is relatively constant (e.g., changes less than a threshold amount). In some examples, a segment mark is inserted at points of discontinuity in the word.

Referring again to FIG. 2A, the height of the word 204 has relatively little change in multiple locations of the word 204. Based on this, respective segment markers 212, 214, 216 indicate where the text can be segmented. Further, a segment marker 218 is provided at a discontinuity of the word 204. In some examples, and although not depicted, a segment marker can be provided before the word 204, and after the word 204.

In accordance with implementations of the present disclosure, and as illustrated in FIGS. 2B and 2C, the segments 206 are inserted between the segment markers 212, 214, 218, 216, such that, for each segment 206, a portion of the word 204 is enclosed by a boundary. As noted above, a boundary can have any appropriate shape, including, but not limited to, a rectangle, a square, a triangle, a circle, an eclipse, a polygon, etc. In some implementations, each boundary is a minimum bounding rectangle of the character in the respective segment. That is, for example, a height of the boundary can be determined based on a height of the text enclosed in the respective segment 206, the boundary being a threshold distance (e.g., measured in pixels), higher and lower than the respective text (see, e.g., FIG. 2C). Similarly, a width of the boundary can be determined based on a width of the text enclosed in the respective segment 206, the boundary being a threshold distance (e.g., measured in pixels) wider than the respective text. Consequently, the word 204 has multiple segments 206 that differ in dimension, and/or area (e.g., pixel*pixel (square pixels)).

Figure 3:
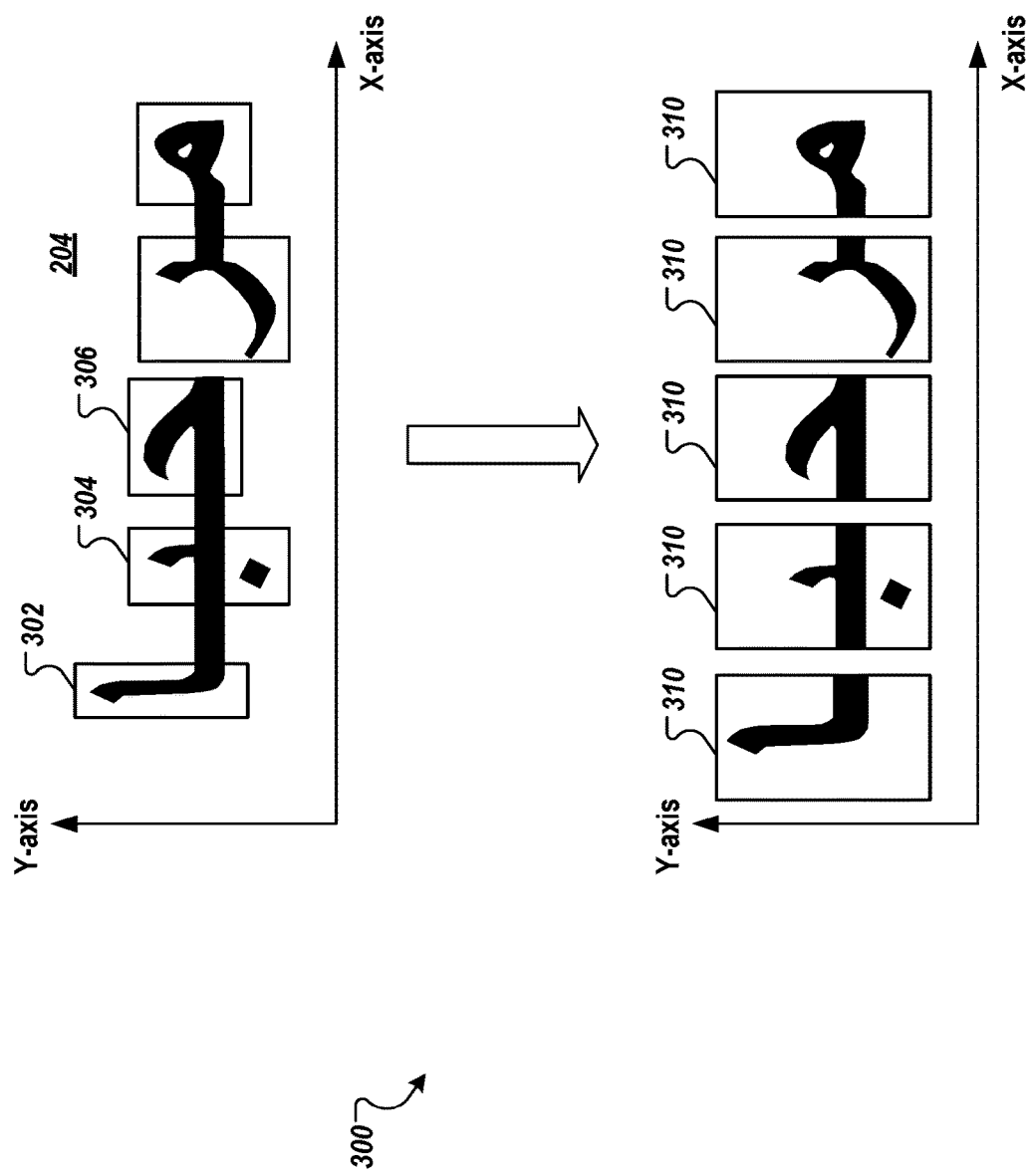
FIG. 3 depicts an example normalization in accordance with implementations of the present disclosure.

In accordance with implementations of the present disclosure, the segments are normalized. In some examples, the segments are normalized to have uniform dimensions. In some examples, the segments are normalized to have inform area. FIG. 3 depicts an example normalization 300 in accordance with implementations of the present disclosure. As illustrated, the boundaries may have different widths with respect to the x-axis (or a horizontal axis), and/or different heights with respect to the y-axis (or a vertical axis).

In some implementations, the normalization includes an edge alignment process. The edge alignment can be an alignment with respect to the y-axis, and/or with respect to the x-axis. For example, an edge alignment with respect to the y-axis can include aligning the heights of the boundaries. In some examples, a lower y-value and an upper y-value is determined for the each boundary's height, and the heights are aligned based on the minimum lower y-value and/or the maximum upper y-value of all boundaries in the set of boundaries. For example, the maximum upper y-value of the word 204 (in FIG. 3) belongs to the segment 302, and the minimum lower y-value of the word 204 belongs to the segments 304, 306. Aligning the boundaries of the word 204 with the minimum lower y-value, and the maximum upper y-values results in the normalized segments 310. In some implementations, the alignment is performed by moving the boundaries to have the same upper/lower (vertical) y-values, and the same side-to-side (horizontal) x-values. In some implementations, the normalization results in uniform sizing of the segments 310 (e.g., 28×28 pixels).

Figure 4:
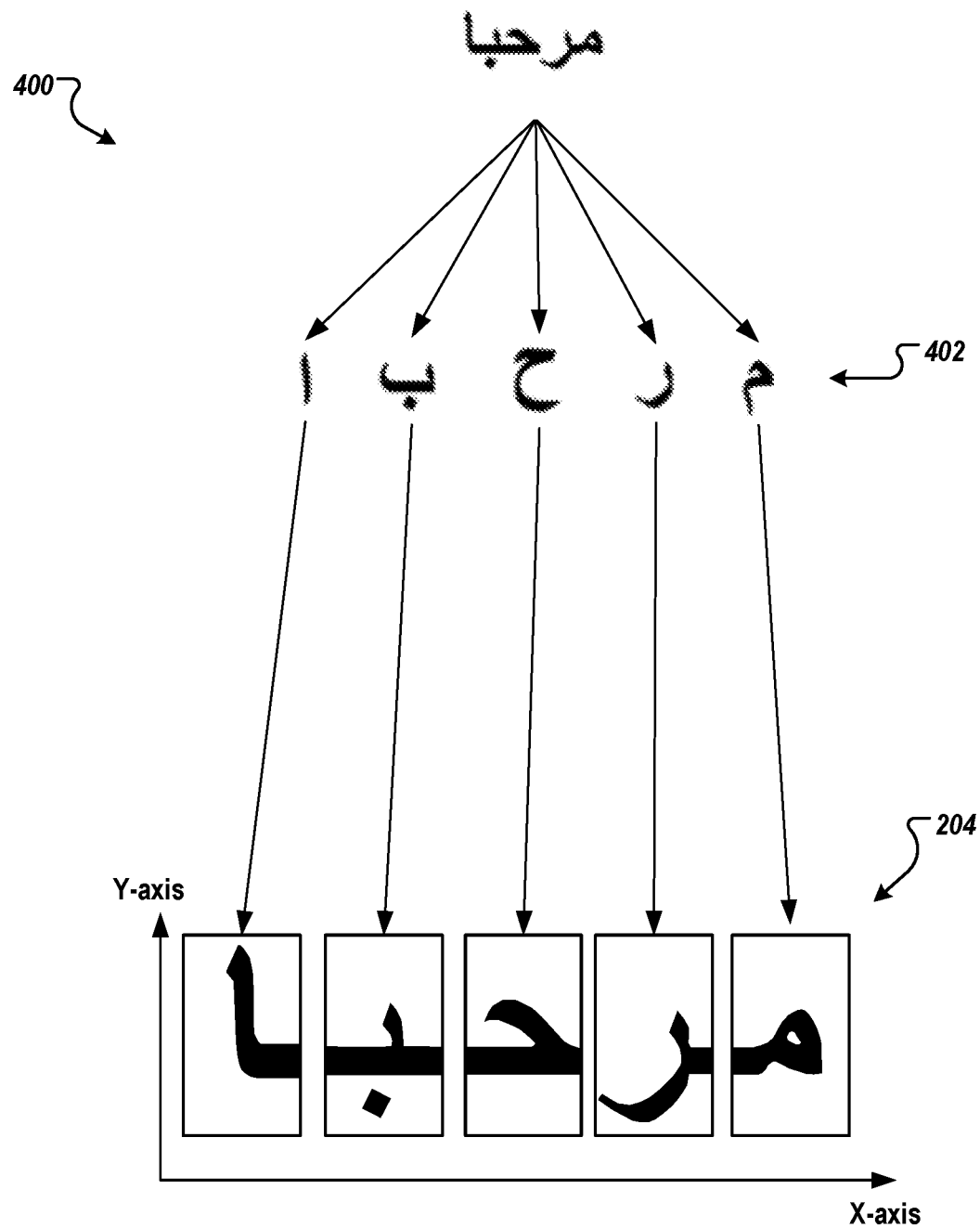
FIG. 4 depicts an example labeling in accordance with implementations of the present disclosure.

In accordance with implementations of the present disclosure, the normalized segments (e.g., the segments 310 of FIG. 3) are processed using a classifier (ML model) to label each segment. In some examples, a label indicates one or more letters that are included in a respective segment. FIG. 4 illustrates an example labeling 400 in accordance with the implementations of the present disclosure. The labeling process is to label each segment with one or more labels 402. For example, each segments of the word 204 in FIG. 4 is labeled by an Arabic letter, each letter being provided as a label 402.

A segment may be labeled based on the location of the segment in a word (or in a text), the width of the segment's boundary, and/or the height of the segment's boundary. For example, for each character of the word 204, a right value and a left value (with respect to the x-axis) may be determined. The labeling of each character may be performed based on the difference of the right value and the left value of the respective character (e.g., within the boundary). In some examples, a label may be associated with different widths, and/or heights. For example, in Arabic text, depending on where a letter is located in a word, the letter may have different shapes. Thus, depending on the location of the letter in a word, the width, and/or the height of the letter may differ.

As described herein, the classifier of the present disclosure can self-train based on feedback on one or more OCR'd images. For example, a first round of training may include providing one or more initial characters to the training process, so that the segments can be labeled based on the one or more characters. Subsequent rounds of training can include self-trainings. For example, the labeled segments (also can be referred to as the "labeled data") can be used in the self-training of the classifier. The training rounds can also be used to evaluate the performance of the classifier, and/or adjust one or more parameters of the classifier. For example, the labeled data can be split into training data, cross-validation data, and testing data, by respective ratios (e.g., 70%, 15%, 15%, respectively).

The training data can be added into the set of training data used for labeling future segments. For example, the classifier may be implemented using one or more neural networks for labeling, and the training data may be used for determining a number of layers (e.g., hidden layers), possible thresholds in each layer, one or more activation functions of the layers, and/or the characteristics of the neurons in the one or more neural networks. The cross-validation data can be used for tuning the parameters of the neural network (e.g., in tuning the activation functions, the thresholds, etc.). The test data can be used to test and assess the accuracy of the system.

In some implementations, the system uses deep machine learning models, and uses the training data, and/or the cross-validation data to tune the model(s). In some examples, the models are based on gradient descent with linear progression.

Figure 5:
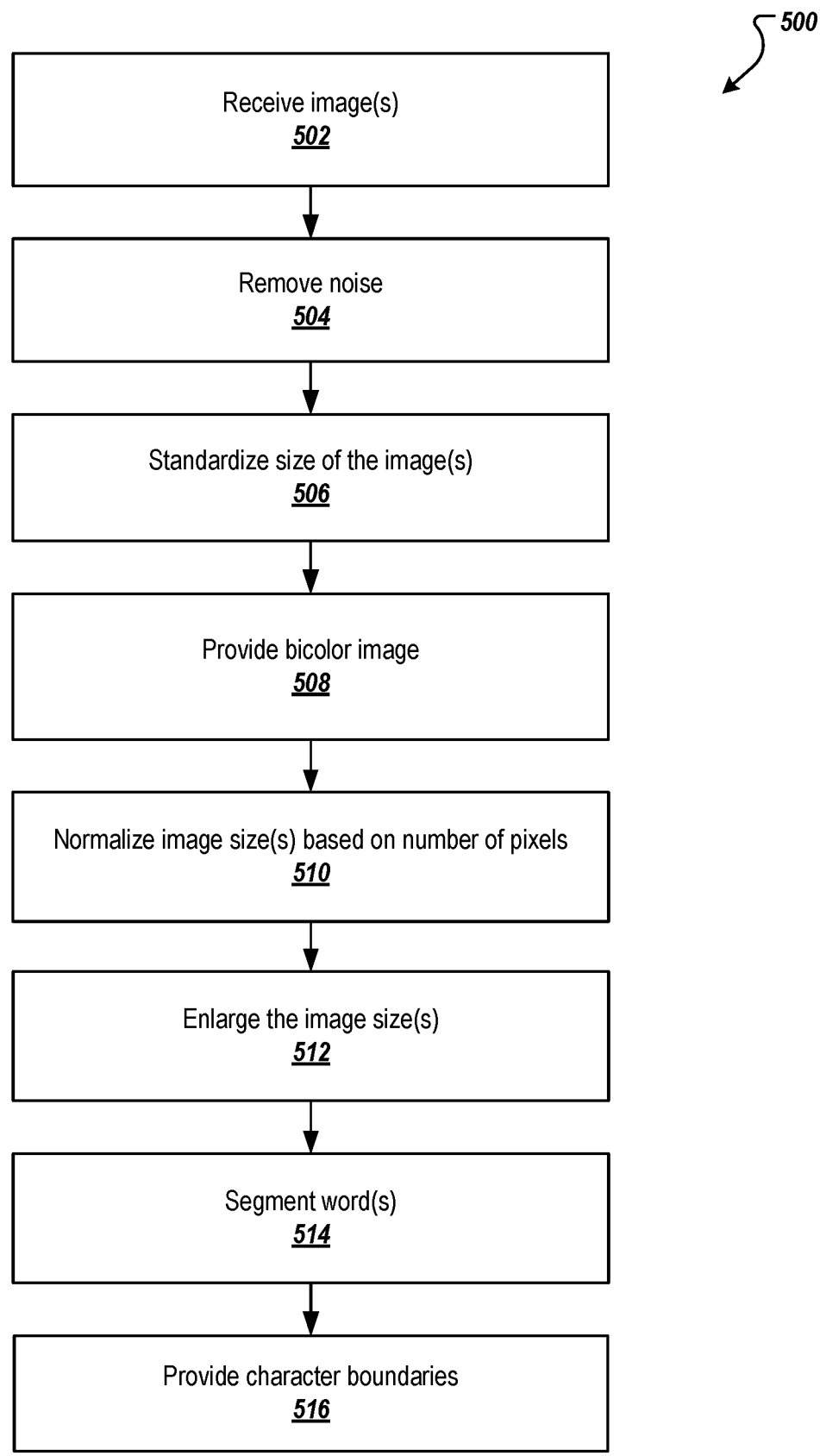
FIGS. 5 and 6 are flowcharts of example processes that can be executed in accordance with implementations of the present disclosure.

FIG. 5 is a flowchart of an example process 500 that can be executed in accordance with implementations of the present disclosure. The process 500 may be applied on one or more images to provide segmented text (e.g., applied on the image 202 of FIG. 2A to segment the word 204). In some implementations, the example process 500 may be performed using one or more computer-executable programs executed using one or more computing devices.

One or more images that include text are received (502). For example, OCR module 108 of FIG. 1 receives the image data 102, which includes the one or more images of text. In some examples, the text includes one or more words that have at least two characters that are connected to each other. The image(s) may include one or more words. For example, the image may be a picture of a physical document (e.g., the physical document 104) that includes text.

Noise is removed from the image (504). In some examples, the noise is removed to make the word more recognizable from the non-text contents in the image. For example, the image may include a pattern, a photograph, or a painting on the background that can be removed as noise. In some cases, the noise is removed to provide a background with a solid color (e.g., different from one or more colors of the one or more words in the image).

The size of the image is standardized (506). In some examples, the image is adjusted to a preset size. For example, an image may be enlarged, or shrunk to match the preset size. Adjusting the image size to a standard size can help in avoiding training (or self-training) of the OCR system based on too small, and/or too large characters.

The image is transferred into a bicolor image with a first color for the background, and a second color for the word (508). The two colors of a bicolor image can be, but are not limited to, black and white. FIG. 2A depicts an example bicolor image, with a back background and a white text (e.g., the word 204).

The image size is normalized based on the number of pixels (510). The image size is enlarged by adding a number of pixels to one or more boarders of the image (512). The added pixels can help in avoiding a loss or a mischaracterization of the characters that are close to the one or more boarders. In some examples, the pixels are added to enlarge the image size to a pre-set size (e.g., a rectangle with 300×500 pixels).

The word(s) in the image is/are segmented into a plurality of segments based on variation of the height of the word (514). In some implementations, where the height of the word is steady over a length along a horizontal axis, a segmentation is applied (e.g., as described above with reference to FIGS. 2A-2C). In some examples, when a change of the height compared to a maximum height of the word is within a predetermined range (e.g., one eighth), the height is considered steady. In some examples, the segmentation applies where there is a discontinuity in the word. Depending on the segmentation, each segment may include one character, or a group of characters (e.g., a word).

A boundary is drawn around each character (516). For example, upon segmenting the word 204 of FIG. 2A, boundaries are provided around each segment as illustrated in FIG. 2B. Each boundary encloses the character(s) in the respective segment. In some implementations, each boundary is a minimum bounding rectangle (or square) that encloses the character(s) in the respective segment. For example, a boundary may be the minimum bounding rectangle that encloses an area with the text color in the respective segment.

Figure 6:
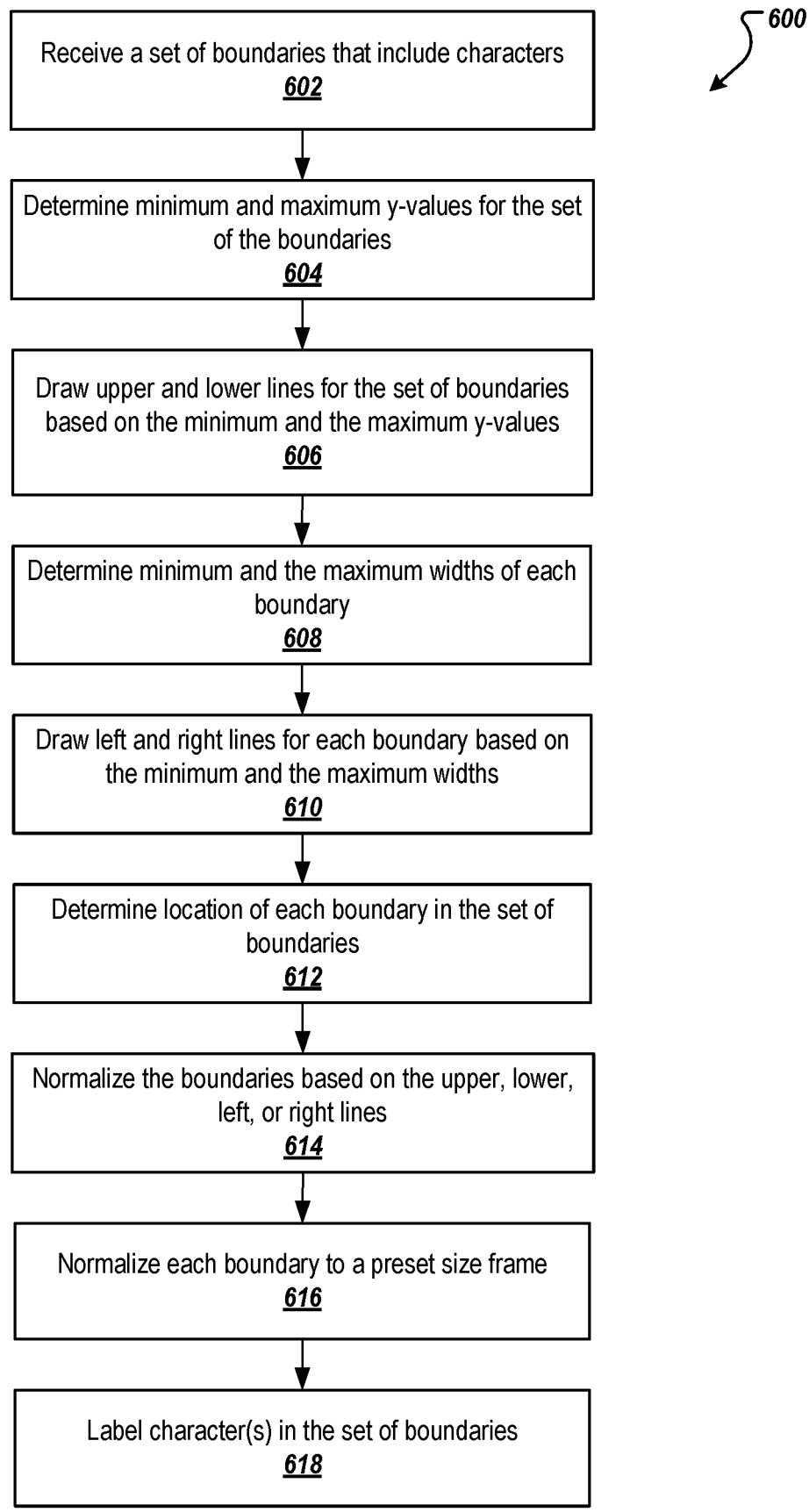

FIG. 6 is a flowchart of an example process 600 that can be executed in accordance with implementations of the present disclosure. For example, the process 600 can be used for labeling, and/or recognizing the characters of the image(s) segmented in the process 500. In some implementations, the example process 600 may be performed using one or more computer-executable programs executed using one or more computing devices.

A set of boundaries are received (602). For example, segmented image data can be provided, which includes metadata defining boundaries determined, as described above with reference to the example process 500. As described herein, each boundary in the set of boundaries encloses one or more characters. The boundaries may be associated with a y-axis (e.g., a vertical axis), and an x-axis (e.g., a horizontal axis). The x-axis, and/or the y-axis may be associated with (e.g., the same as, or tilted) a horizontal axis and/or vertical axis of the image.

A minimum y-value and a maximum y-value are determined for the set of boundaries (604). In some examples, the minimum y-value is the minimum lower y-value (of the boundaries) in the set of boundaries (e.g., the lower y-value of the character 304 in FIG. 3), and the maximum y-value is the maximum upper y-value (of the boundaries) in the set of boundaries (e.g., the upper y-value of the character 302 in FIG. 3). In some examples, the minimum y-value is determined based on the minimum y-value of the characters in the set of boundaries, and/or the maximum y-value is determined based on the maximum y-value of the characters. In some examples, the minimum y-value and/or the maximum y-value is a preset value (e.g., y=0, or y=10). Optionally, an upper line and a lower line can be drawn for the set of boundaries (606). The upper line and/or the lower line can be used for normalizing the heights of the boundaries (e.g., in part 614).

A minimum x-value and a maximum x-value are determined for each boundary in the set of boundaries (608). For example, a width in FIG. 3 marks the minimum x-value and the maximum x-value of the character 304. In some examples, the width of a boundary is determined based on the differences between the maximum x-value and the minimum x-value. Optionally, a left line and a right line can be drawn for each boundary (610); the left line represents the minimum x-value and a right line represents the maximum x-value of the respective boundary. The left line and/or the right line can be used in normalizing the boundaries (e.g., in part 614), or in labeling (or recognizing) the character enclosed in the respective boundary.

A location of each boundary in the set of boundaries is determined (612). A location of a boundary in the set of boundaries can indicate the location of the character(s) (enclosed by the boundary) in the word that is represented by the set of boundaries. In some examples, the location of a boundary is determined based on a horizontal order of the boundaries in the set of boundaries. For example, the character 304 in FIG. 3 is a middle character, and the character 302 is an ending character.

The boundaries are normalized. In some implementations, the boundaries are normalized based on at least one of the upper line, the lower line, the left line, and the right line (614). For example, the boundaries may be adjusted to match at least one of the listed lines. In some implementations, the boundaries are normalized to match a preset size (616). For example, the boundaries may be adjusted so that each segment has 28×28 pixels. In some implementations, the adjustment of the boundaries is performed by adding pixels to the respective segments. For example, pixels are added to the segments of the word 206 to adjust each boundary to have the maximum y-value and the minimum y-value of the set of boundaries, as shown in the word 306.

The characters in the set of boundaries are labeled (618). FIG. 4 depicts an example labeling of the characters in the set of boundaries representing the word 406. The labeling can be performed based on the location of each boundary in the set of boundaries, the width, and/or the height of each boundary (or the character(s) enclosed in each boundary). In some implementations, the labeling is performed based on alphabetical characters. In some examples, the labeling is based on Arabic alphabetical characters. The labeling may be performed on a character basis, or on a word basis. For example, one or more boundaries of the set of boundaries may include two or more characters (e.g., a word), and may be labeled as a word.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for optical character recognition of a language script, the method being executed by one or more processors, the method comprising:
   receiving, by the one or more processors, an image comprising a graphical representation of a word written in the language script, the image having a first axis and a second axis;
   segmenting, by the one or more processors, the word into two or more segments, each segment being defined by a respective boundary of the segment, wherein the segmenting comprises:
      applying multiple segment markers on the word with respect to the second axis, wherein at least one segment marker is applied to a part of the word where a height of the word along the first axis changes for less than a predetermined threshold value when moving along the second axis, and
      providing, by the one or more processors and for each segment of the two or more segments, a respective boundary between two consecutive segment marks such that (i) edges of the respective boundary are formed between the two consecutive segment marks, and (ii) the respective boundary encloses at least one respective character of the word for the segment;
   normalizing, by the one or more processors, boundaries of the two or more segments by aligning edges of the boundaries; and
   labeling, by the one or more processor, each segment of the two or more segments with a respective label, the respective label indicating a language character within the respective boundary.

2. The method of claim 1, further comprising, prior to segmenting, filtering the image to remove noise.

3. The method of claim 1, further comprising, prior to segmenting, scaling the image.

4. The method of claim 1, further comprising, prior to segmenting, applying a morphology filter to transform the image.

5. The method of claim 1, further comprising adjusting the boundary of each segment to normalize pixel size across segments.

6. The method of claim 5, wherein normalizing comprises scaling at least one boundary, scaling comprising one of shrinking using an inter-area algorithm, and enlarging using an inter-cubic algorithm.

7. The method of claim 1, wherein the edges of the boundaries are aligned.

8. The method of claim 1, wherein the language script comprises Arabic script, and the language character comprises an Arabic character.

9. The method of claim 1, wherein each segment includes a single character only.

10. The method of claim 1, further comprising determining one or more of a height of the boundary and a width of the boundary.

11. A non-transitory computer-readable storage medium coupled to one or more processors and having instructions stored thereon which, when executed by the one or more processors, cause the one or more processors to perform operations for optical character recognition of a language script, the operations comprising:
   receiving an image comprising a graphical representation of a word written in the language script, the image having a first axis and a second axis;
   segmenting the word into two or more segments, each segment being defined by a respective boundary of the segment, wherein the segmenting comprises:
      applying multiple segment markers on the word with respect to the second axis, wherein at least one segment marker is applied to a part of the word where a height of the word along the first axis changes for less than a predetermined threshold value when moving along the second axis, and
      providing, for each segment of the two or more segments, a respective boundary between two consecutive segment marks such that (i) edges of the respective boundary are formed between the two consecutive segment marks, and (ii) the respective boundary encloses at least one respective character of the word for the segment;
   normalizing boundaries of the two or more segments by aligning edges of the boundaries; and
   labeling each segment of the two or more segments with a respective label, the respective label indicating a language character within the respective boundary.

12. The computer-readable storage medium of claim 11, wherein operations further comprise, prior to segmenting, filtering the image to remove noise.

13. The computer-readable storage medium of claim 11, wherein operations further comprise, prior to segmenting, scaling the image.

14. The computer-readable storage medium of claim 11, wherein operations further comprise, prior to segmenting, applying a morphology filter to transform the image.

15. The computer-readable storage medium of claim 11, wherein operations further comprise adjusting the boundary of each segment to normalize pixel size across segments.

16. The computer-readable storage medium of claim 15, wherein normalizing comprises scaling at least one boundary, scaling comprising one of shrinking using an inter-area algorithm, and enlarging using an inter-cubic algorithm.

17. The computer-readable storage medium of claim 11, wherein the edges of the boundaries are aligned.

18. The computer-readable storage medium of claim 11, wherein the language script comprises Arabic script, and the language character comprises an Arabic character.

19. The computer-readable storage medium of claim 11, wherein each segment includes a single character only.

20. The computer-readable storage medium of claim 11, wherein operations further comprise determining one or more of a height of the boundary and a width of the boundary.

21. A system, comprising:
a computing device; and
a computer-readable storage device coupled to the computing device and having instructions stored thereon which, when executed by the computing device, cause the computing device to perform operations for optical character recognition of a language script, the operations comprising:
receiving an image comprising a graphical representation of a word written in the language script, the image having a first axis and a second axis,
segmenting the word into two or more segments, each segment being defined by a respective boundary of the segment, wherein the segmenting comprises:
applying multiple segment markers on the word with respect to the second axis, wherein at least one segment marker is applied to a part of the word where a height of the word along the first axis changes for less than a predetermined threshold value when moving along the second axis, and
providing, for each segment of the two or more segments, a respective boundary between two consecutive segment marks such that (i) edges of the respective boundary are formed between the two consecutive segment marks, and (ii) the respective boundary encloses at least one respective character of the word for the segment,
normalizing boundaries of the two or more segments by aligning edges of the boundaries, and
labeling each segment of the two or more segments with a respective label, the respective label indicating a language character within the respective boundary.

22. The system of claim 21, wherein operations further comprise, prior to segmenting, filtering the image to remove noise.

23. The system of claim 21, wherein operations further comprise, prior to segmenting, scaling the image.

24. The system of claim 21, wherein operations further comprise, prior to segmenting, applying a morphology filter to transform the image.

25. The system of claim 21, wherein operations further comprise adjusting the boundary of each segment to normalize pixel size across segments.

26. The system of claim 25, wherein normalizing comprises scaling at least one boundary, scaling comprising one of shrinking using an inter-area algorithm, and enlarging using an inter-cubic algorithm.

27. The system of claim 21, wherein the edges of the boundaries are aligned.

28. The system of claim 21, wherein the language script comprises Arabic script, and the language character comprises an Arabic character.

29. The system of claim 21, wherein each segment includes a single character only.

30. The system of claim 21, wherein operations further comprise determining one or more of a height of the boundary and a width of the boundary.

* * * * *